Greer & King,

Cook Stove

No 3,469. Reissued June 1, 1869.

Witnesses:

Jas. H. Layman

Sam'l Knight

Inventors:

James Greer

R. J. King

By Knight Bros. Attys.

United States Patent Office.

JAMES GREER AND RUFUS J. KING, OF DAYTON, OHIO.

*Letters Patent No.* 87,925, *dated March* 16, 1869; *reissue No.* 3,469, *dated June* 1, 1869.

COOKING-STOVE.

The Schedule referred to in these Letters Patent and making part of the same.

*To all whom it may concern:*

Be it known that we, JAMES GREER and RUFUS J. KING, both of Dayton, in the county of Montgomery, and State of Ohio, have invented a new and useful Improvement in Cook-Stoves; and we do hereby declare the following to be a full, clear, and exact description thereof, reference being had to the accompanying drawings, making part of this specification.

This is an improvement in the class of stoves which has a fender inside of the fire-doors, for the double purpose of protecting said doors from direct contact with the incandescent mass, and of retaining the latter within the fire-place when the doors are opened; and Our invention consists in making such fender of one or more "doors," so as to adapt it to be opened to give access to the fire-place, when desired, as for removing a portion or the whole of its contents, for broiling, or other purposes; and in the combination of an imperforate fender, so constructed, with a registered outer door or doors, to preheat the entering air, and direct it to the bottom of the fire.

In the drawings—

Figure 1:
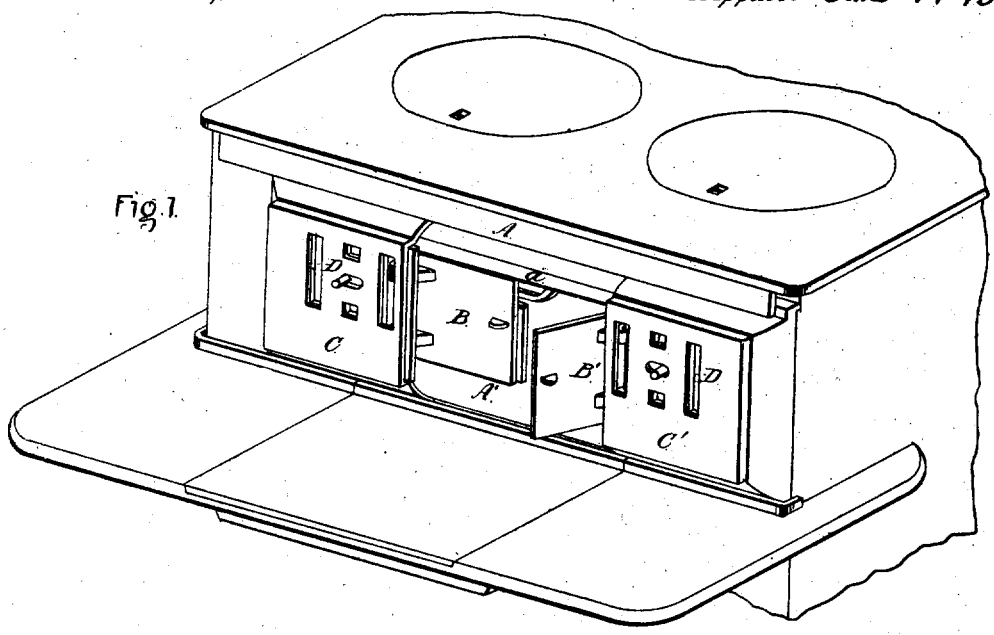
Figure 1 is a perspective view of the front portion of a stove provided with our improvement, the front doors being open.
Figure 2:
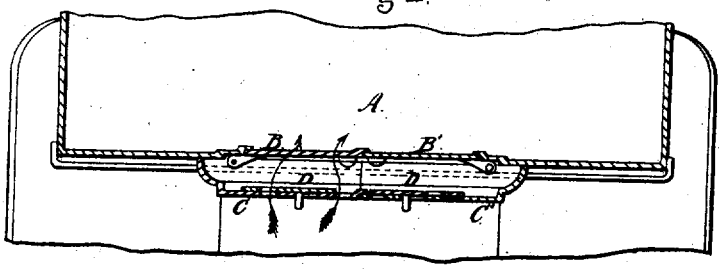
Figure 2 is a horizontal section thereof, with the fire-doors closed, and the register open.
Figure 3:
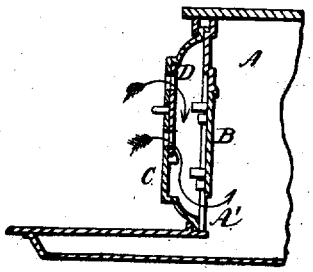
Figure 3 is a vertical section of the same.

Fitted to the front opening of the fire-place of the stove, A, are one or more doors, B B′, constituting the "fender," which is thus adapted to be opened, when desired, to give access to the fire, for its removal, or for other purposes. Said doors, as employed in the combination shown, are made imperforate, and a space is provided beneath them, as shown in figs. 1 and 3, for the passage of air to the fire.

C C′ are two external doors, adapted to shut and open in any usual or convenient manner, so as either to enclose or disclose the inner doors B B′ at will.

Each door C C′ has, near its upper part, a register, D, for the purpose of admitting draught-air, and is so constructed or arranged as, in connection with the space below the inner doors B B′, to form a passage, A′, through which the air passes from the registers D, and having become warm by contact with the inner doors, while serving at the same time to keep the outer doors cool, is directed to the bottom of the fire-space.

It will be seen, that by this arrangement, all of the draught-air is obliged to enter the fire in a more or less preheated condition, and that it is compelled to pass entirely through the body of the fire, thus insuring perfect combustion, and avoiding the deleterious effects of cooling-currents in the flues, and against the cooking-vessels and oven.

We claim herein as new, and of our invention—

1. The fender B B′, constructed substantially as herein described, so as to admit of its being opened, for the purpose of getting at the fire, for broiling and other purposes.

2. The combination of the imperforate inner doors or fender B B′, forming the front wall of the fire-chamber, and affording access thereto for the removal of its contents, and the outer doors C C′, provided with the registers D, and forming, in connection with said inner doors, a space or passage for heating the draught-air and directing it to the bottom of the fire-space, and also to keep said outer doors cool, substantially as described.

In testimony of which invention, we hereunto set our hands.

JAMES GREER.
RUFUS J. KING.

Witnesses:
FRANK L. ALLEN,
JOHN M. BOND.